Feb. 7, 1939.　　　C. L. HARBOLT　　　2,145,981
CULTIVATOR
Filed Aug. 6, 1937　　　4 Sheets-Sheet 2
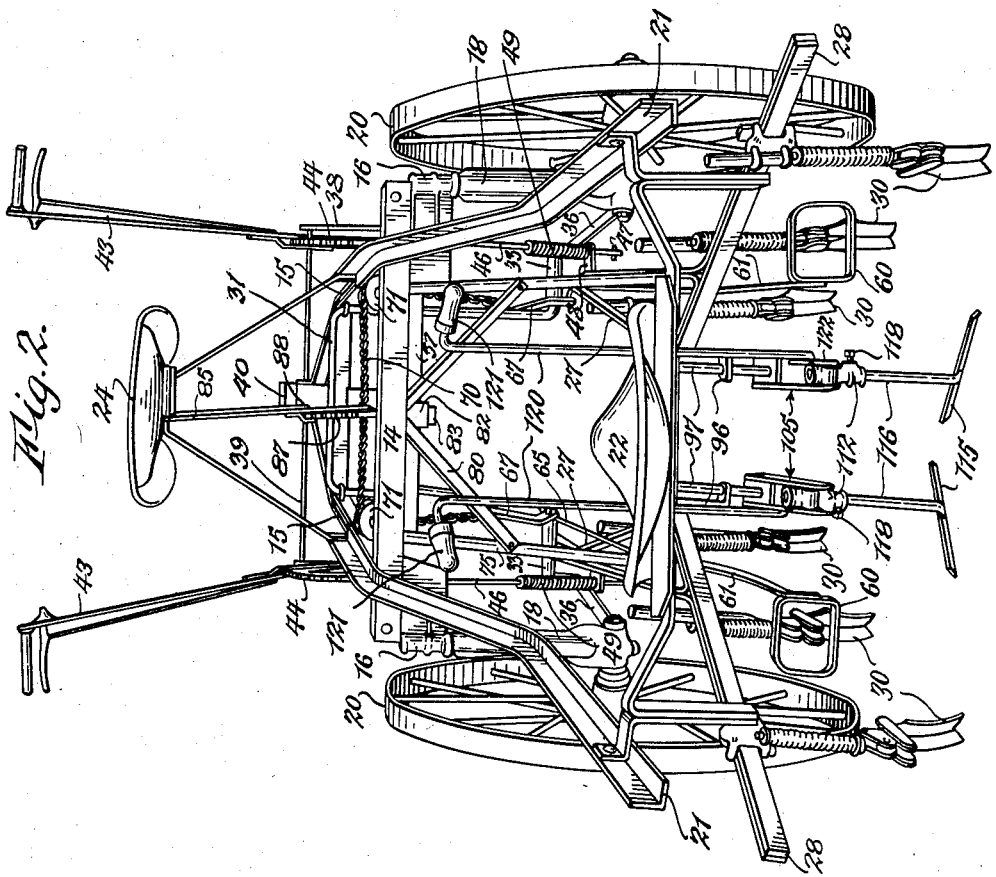
INVENTOR
Curtis L. Harbolt
BY
Parker, Andrews & Farmer
ATTORNEYS

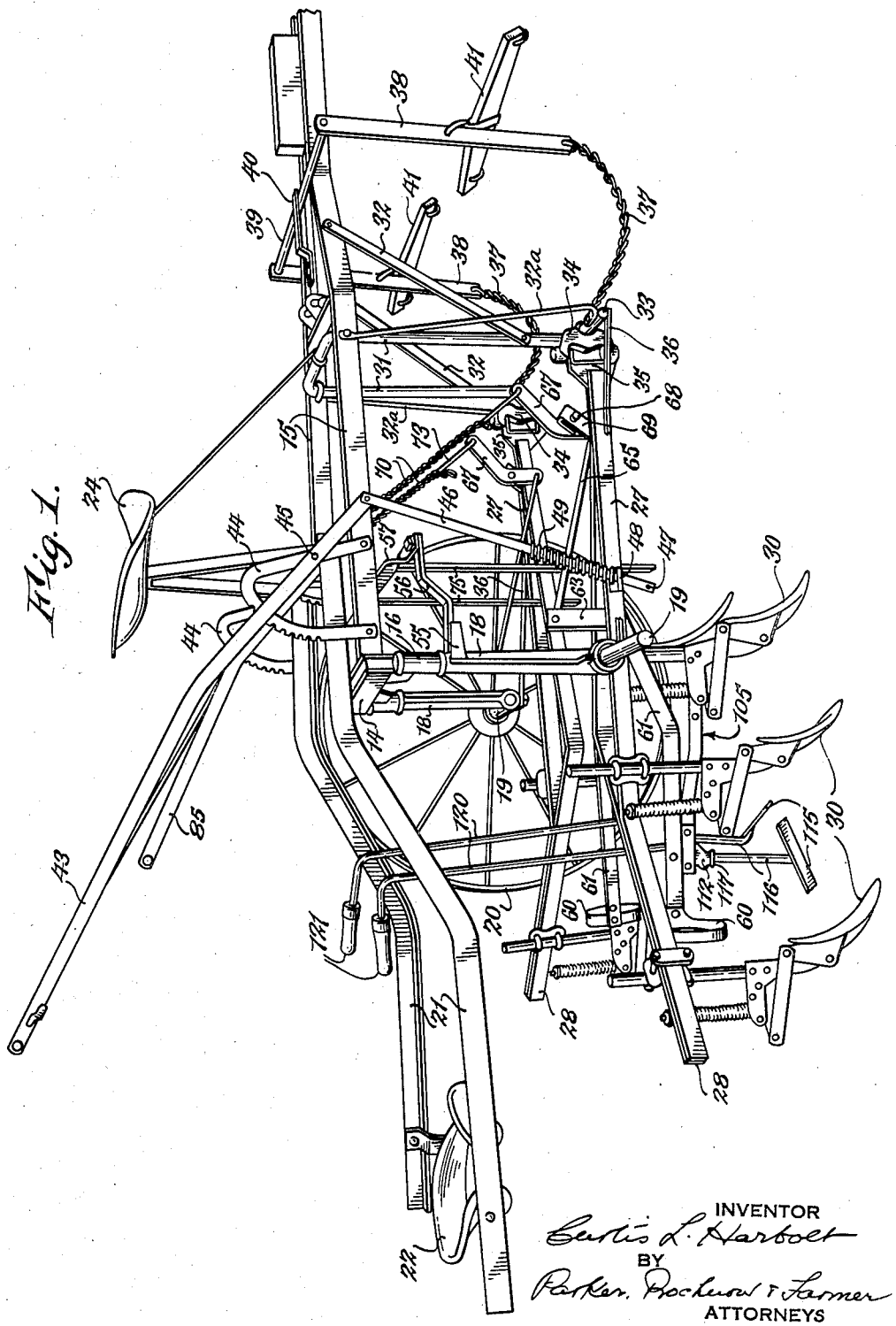

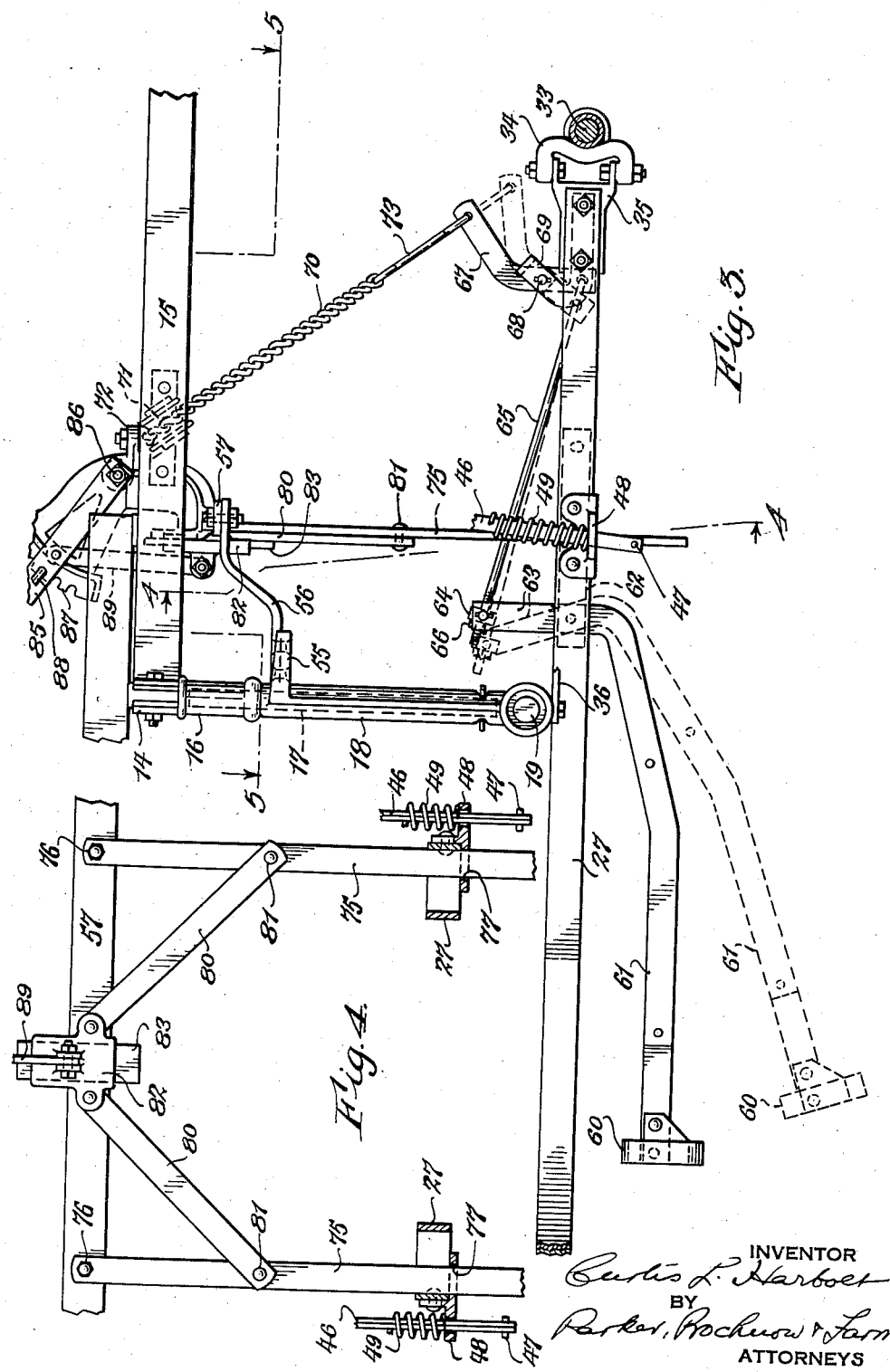

Patented Feb. 7, 1939

2,145,981

UNITED STATES PATENT OFFICE 2,145,981

CULTIVATOR

Curtis L. Harbolt, Brantford, Ontario, Canada, assignor to Cockshutt Plow Company Limited, Brantford, Ontario, Canada Application August 6, 1937, Serial No. 157,797

9 Claims. (Cl. 97—155)

This invention relates to improvements in cultivators such as are commonly used for cultivating crops planted in rows.

One of the objects of this invention is to provide a cultivator of this kind of improved construction which is easier to operate, and consequently, less tiring upon the operator. It is also an object to provide a cultivator with an improved mechanism for steering the same, which is so arranged that it is actuated while the operator sits in a natural and convenient position. A further object is to provide a foot operated steering mechanism in which the foot treadles used for steering have an up and down movement. It is also an object of this invention to arrange the foot pedals for steering the cultivator below the gang frames on which the cultivating implements are mounted. Another object is to so construct the steering mechanism that the foot pedals remain in the same relative positions with regard to the gang frames regardless of the adjustment of the same for deep or shallow cultivation. Another object is to provide a steering and ground working implement shifting device which is so constructed that the foot pedals are mounted on the gange frames and move therewith, but are moved by the operator in an up and down direction to effect steering of the cultivator.

Other objects of this invention will appear from the following description and claims.

In the accompanying drawings:

Fig. 1 is a perspective side view of a cultivator embodying this invention, one of the wheels of the cultivator being omitted for sake of clearness.

Fig. 2 is a perspective rear view thereof.

Fig. 3 is a fragmentary elevation of the cultivator showing a part of the steering mechanism.

Fig. 4 is a fragmentary sectional elevation thereof, on line 4—4, Fig. 3.

Figure 5:
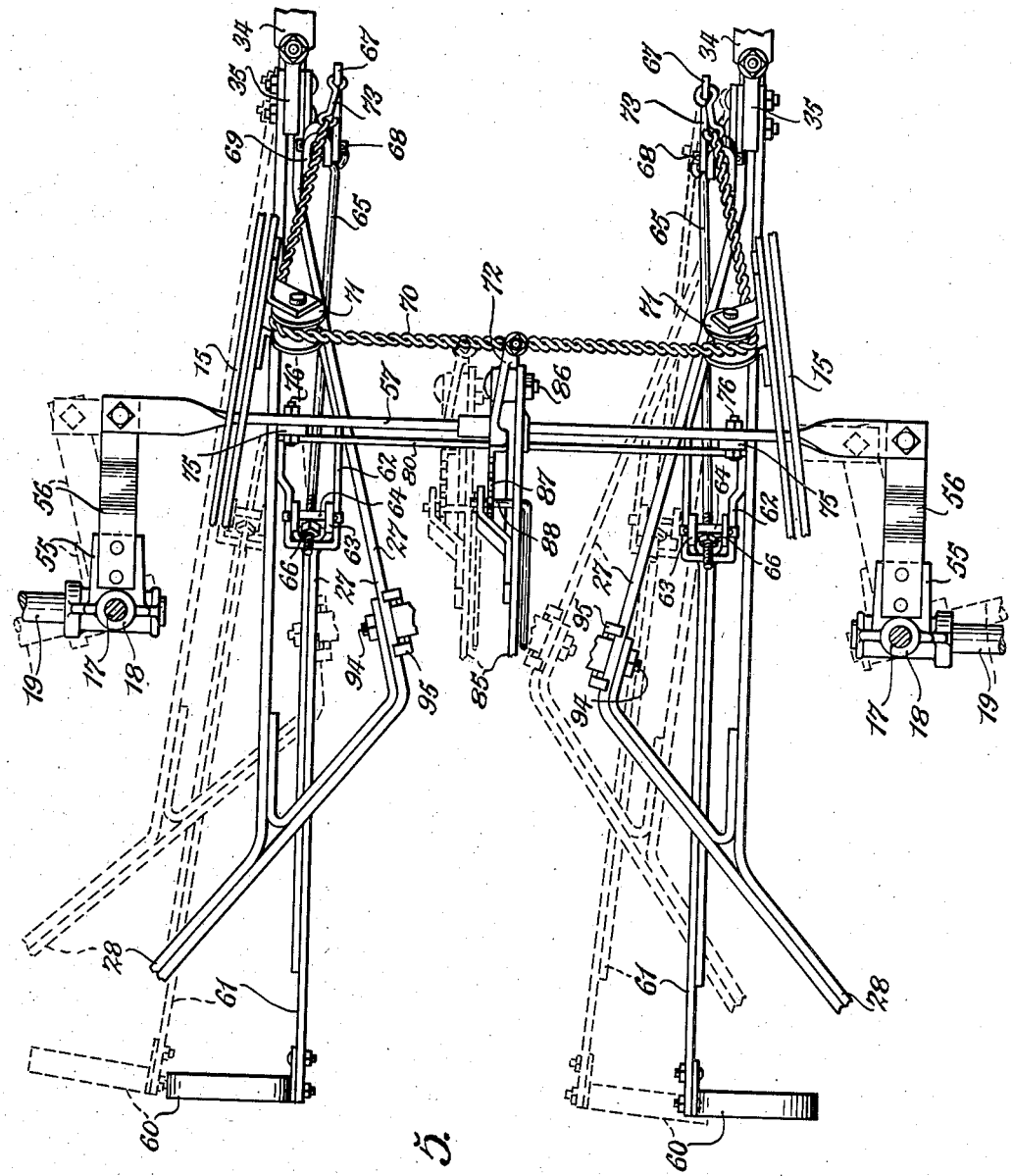
Fig. 5 is a fragmentary sectional plan view of the cultivator taken partly in section on line 5—5, Fig. 3.

The cultivator may be provided with a main frame of any suitable or desired construction, that shown including a pair of longitudinally extending frame members 15 which converge toward the front of the cultivator where they are arranged to be connected with any suitable tongue (not shown). The rear ends of the frame members 15 are secured to a transverse frame member 14, which may be formed of a number of structural members or parts and the end portions of which are provided with hub portions or sockets 16 in which the upper ends of downwardly extending, substantially vertical pivot members or pins 17 are secured, see Figs. 3 and 5. The upright parts 18 of two pivoted axles 19 are pivotally mounted to rotate about the upright pivot pins 17. Suitable wheels 20 are journalled on the axles 19, and it will be obvious that by turning the axle members 18 about the upright pivot members 17, the wheels 20 can be adjusted for steering the cultivator. 21 represents a pair of rearwardly extending frame members, the front ends of which are rigidly secured to the rear ends of the frame members 15. The frame members 21 near their rear ends support a seat 22 for an operator and another seat 24 for a driver may be provided on the front portion of the frame.

27 represents a pair of gang frames suitably mounted below the main frame of the cultivator. These gang frames may be of any suitable or desired construction, those shown, see particularly Figs. 1, 2 and 5 being fabricated of strips of steel and having their rear portions diverging rearwardly from the middle portion of the machine, as indicated at 28 to form supports for the cultivator blades or ground working implements 30, which may be of any suitable or desired form.

The gang frames 27 may be supported from the main frame of the cultivator in any suitable or desired manner, and in the construction illustrated, the front ends of these frames are pivotally secured to the lower ends of the downwardly extending member or arch 31 of substantially inverted U-shape, the upper end of which is rigidly secured to the frame members 15, and the downwardly extending parts of which may be rigidly held in place by means of brace members 32 and 32a. The lower ends of the U-shaped members are turned outwardly to form substantially horizontally extending pivots 33, on which coupling members 34 may be pivotally mounted. These coupling members have bearings for upright pivots to each of which a clevis 35 may be pivotally connected. The front end of each gang frame 27 is secured to a clevis 35. By means of this mounting, it will be noted that the gang frames 27 may swing upwardly and downwardly about the outwardly extending pivot ends 33 of the arch member 31 and the gang frames may be swung laterally about the upright pivotal connections of the clevises 35 with the coupling members 34. The outer ends of the pivot ends 33 of the arch member are also preferably braced or linked with the lower ends of the pivotal axles 18, for example, by means of links 36, see particularly Figs. 1 and 2. The rear ends of the links 36 may be pivotally connected to the lower ends of the axle members 18, so as to permit turning of the axles about their vertical pivots.

The draft may be applied to the gang frames 27 in any suitable manner, for example, by means of chains 37 connected to the lower ends of upright draft bars 38 connected at their upper ends by means of a cross bar 39 which engages a part 40 secured to the front ends of the frame members 15. The draft may be applied to the upright draft bars 38 in any suitable manner, for example, by means of single trees 41 pivoted intermediate of the ends of the draft bars so that a portion of the draft will be transmitted to the frame members 15 and another portion to the cultivator gang frames 27. Pulls on the chains 37 will be transmitted by the links 36 to the pivotal axles 18. Any other means of pivotally mounting the gang frames 27 with reference to the main frame of the cultivator and for applying draft to the cultivator may be provided, and also any suitable means for adjusting the gang frames 27 to raise and lower them may be employed. In the construction shown for this purpose, a pair of levers 43 are provided, one being provided for each gang frame and arranged to cooperate with toothed segments 44 which are secured to the frame members 15. The levers are pivoted at 45 on portions of the segments 44 and their lower ends are connected to links 46, the lower ends of which extend through slots in brackets 48 secured to the gang frames. Each link 46 has at its lower end a pin 47 adapted to engage with its slotted bracket 48 for raising the gang frame. Each link 46 is also provided with a coil spring 49, the upper end of which is rigidly secured to the link, and the lower end of which engages the upper face of the bracket 48 to yieldingly urge its gang frame downwardly. When the outer ends of the levers 43 are swung downwardly, the links 46 are raised so that the pins 47 engage the brackets 48 and swing the gang frames 27 upwardly about the horizontally extending ends 33 of the arch member 31 so that the ground working implements or cultivator blades 30 are raised out of the ground. When the levers 43 are swung in the opposite direction, the springs 49 exert pressure upon the bracket members 48 to urge the ground working implements 30 downwardly into the ground. Any other means for adjusting the gang frames in up and down directions may be employed.

Steering mechanism

In order to steer the cultivator by turning the wheel axle members 18 about their upright pivots 17, the pivoted axle members 18 are provided with forwardly extending brackets 55 to which arms 56 are secured, the front ends of which are connected to a cross bar or connecting bar 57. Hence it will be obvious that if the connecting bar 57 is moved crosswise of the cultivator, the two pivoted wheel axles 18 will both be turned in the same direction and to the same extent. In order to provide for this movement, I preferably arrange a pair of foot pedals 60 in a position convenient with relation to the operator's seat 22 so that the operator in placing his feet into the two foot pedals 60 will be in a convenient and comfortable position. For this purpose, it is desirable that the foot pedals 60 be arranged as low as possible and in order to further facilitate the steering of the cultivator, I also provide mechanism connecting the foot pedals whereby downward pressure exerted on one or other of the foot pedals will produce the desired steering. For this purpose, I secure the foot pedals to the rear ends of foot levers 61, the front ends of which are pivoted in suitable brackets 62, Fig. 5, which are rigidly secured to the gang frames 27. The front ends of the foot levers are provided with upwardly extending parts 63 and preferably the front portions of the foot levers 61 are made of two strips of material arranged side by side and secured together throughout the greater portion of their length. At their front ends, the upwardly bent parts 63 of these strips are spaced apart so as to produce a forked construction. An apertured swivel member 64 is pivoted on and extends across the space between the upwardly bent ends 63 of the foot lever. A link 65 extends through the aperture in the swivel member and the end of the link is threaded to receive a nut 66. Consequently, when the foot lever 61 is depressed, as clearly shown in Fig. 3, the swivel member 64 engages the nut 66 and exerts a pull on the rod or link 65.

The front end of each rod 65 is pivotally secured to the lower arm of a lever 67 pivoted at 68 on a suitable lug or bracket 69 rigidly secured on the gang frame 27, and the upper end of the lever 67 may be secured in any suitable or desired manner, to one end of a chain or flexible member 70 which is arranged to pass over guide pulleys 71 suitably arranged on the main frame members 15. The other end of the chain 70 is similarly connected with the end of the lever 67 on the other side of the cultivator, and consequently, the chain 70, as clearly shown in Fig. 5, forms a connection between the two foot levers 61 and the mechanism connected therewith, so that the depression of one foot pedal 60 will produce a raising of the other foot pedal. The chain 70 is connected intermediate of its ends to the transversely extending link 57 which connects with the pivoted axles 19, the connection between the chain and the cross link 57 being effected through a suitable connecting member 72, which is rigidly secured on the connecting bar 57. It will, consequently, be noted that by depressing one or another foot pedal 60, the cultivator will be steered to the right or left by swinging the pivoted axle members 18.

The construction described also has the advantage that the foot pedals can be readily adjusted to a height suitable to the convenience of the operator by adjusting the nuts 66 on the links 65. Further adjustment can be made by means of the chain 70 and connecting links 73, each of which is pivotally connected at one end to the end of the lever 67, and the other end of which may be shaped to hook into one or another link of its end of the chain 70.

It will be noted particularly in Figs. 1 and 3, that guide rollers 71 are so located and the levers 67 are so pivoted that the ends thereof to which the links 73 are attached, will during the adjustment of the steering mechanism move approximately in a line between the guide rollers 71 and the pivot members 33. This arrangement has the important result that the foot pedals 60 will have approximately the same relative positions to the gang frames when the gangs are raised or lowered by means of the levers 43. Other connections between the foot levers and the steering mechanism may, of course, be used in place of the mechanism which is herein shown by way of example.

Lateral adjustment of cultivator gangs

My improved steering mechanism is also arranged to cooperate with suitable spreading mechanism which serves to swing the gang frames 27 toward and from each other, and furthermore, my improved steering mechanism also operates to move the two gang frames together or as a unit toward one or the other side of the cultivator so that the ground working implements 30 may be readily adjusted as may be required because of irregularities in rows of plants. Consequently, when the steering mechanism is actuated to steer the cultivator toward one side, the gang frames 27 are also moved transversely of the machine toward the same side.

In the particular mechanism illustrated in the drawings for accomplishing these results, a spreading mechanism is provided which is shown particularly in Figs. 4 and 5, and which is mounted on the connecting bar 57 of the steering mechanism. This spreading mechanism includes a pair of upright bars or levers 75 pivoted at their upper ends at 76 on the connecting bar 57 of the steering mechanism. The lower portions of the levers 75 extend loosely through slots or apertures 77 formed in inwardly extending portions of the brackets 48 which are secured to the gang frames. Means are provided for moving the levers 75 about their pivots 76 so as to move the gang frames 27 toward or from each other. In the construction shown for this purpose, a pair of toggle links 80 is provided, each of which is pivoted at one end at 81 to a lever 75, see particularly Fig. 4, and the other ends are pivoted to a vertically adjustable slide member 82 which may be of any suitable construction, and which is mounted to slide in an upright guide 83 rigidly secured on the connecting link 57 of the steering mechanism.

The adjustment of the vertically slidable member 82 is effected by means of a spreader lever 85, one end of which is pivoted at 86 on the part 72 which is secured to the connecting link 57 of the steering mechanism. The part 72 also has a rearwardly extending projection forming a toothed segment 87 with which a dog or ratchet 88 of the spreader lever 85 may engage to hold this lever in the desired position. The spreader lever is connected to the vertically movable slide member 82 by means of a link 89, Figs. 3 and 4. As a result of this construction, it will be obvious that by adjusting the spreader lever 85 about its pivot 86, vertical movement will be transmitted through the link 89 to the slide 82 which movement is transmitted to the toggle links 80. If the lever is actuated to move the slide 82 downwardly, the toggle links 80 will swing the levers 75 outwardly away from each other and because of the sliding connection between these levers and the gang frames 27, the gang frames will be moved about the pivotal connection at the front ends thereof away from each other. Upward movement of the spreader lever 85 results in a corresponding movement of the gang frames toward each other, so that the cultivator blades may be adjusted toward and from each other according to the size of the plants in the field which is being cultivated. It will also be noted, particularly with reference to Fig. 5, that the steering mechanism automatically moves the gang frames toward one or other side of the machine. If, for example, the foot pedal 60 at the left of the machine is pressed downwardly, this exerts a rearward pull on the link 65 connected with the foot lever 61, and this in turn causes the end of the chain 70 at the left hand side of the machine to be moved downwardly, which in turn, through the medium of the connecting member 72, moves the connecting link 57 of the steering mechanism to the left. This causes a movement of the parts from the full line positions shown in Fig. 5 into the broken line positions, so that the pivoted axles of the cultivator will be swung in a direction to steer the cultivator to the left and also the movement to the left of the connecting link 57 will be transmitted to the upright levers 75 which will also move bodily to the left without changing their relation to each other, and thus move the gang frames 27 to the left. The other end of the chain 70, which is connected with the right foot pedal 60 will, of course, produce a corresponding upward movement of the right foot pedal. Because of the fact that the foot levers 61 are mounted on the gang frames 27, these levers will move with the gang frames in the direction in which the gang frames move so that if the foot lever 60 is pressed downwardly, it will also receive a movement to the left, as shown in Fig. 5.

The construction described has the advantage that the foot pedals 60 are located sufficiently below the seat 22 so that the operator sitting on the seat with his feet in the foot pedals will be in a natural position. When he exerts force on one or other foot pedal, this force is mainly downwardly, which enables him to exert greater force on the foot pedals with less effort than is the case with cultivators in which the steering is effected by forward and rearward movement of the foot pedals. Furthermore, by using foot levers 61, the operator acts on the steering and gang frame shifting mechanism with an increased leverage. It is also of advantage that the foot pedals move laterally with the gang frames and the foot pedals 60 are so located with reference to the seat 22 that an operator in exerting downward pressure on a foot pedal, will also exert this pressure to some extent in the sidewise direction in which the gang frames will be swung by that foot pedal. Consequently, the lateral component of the force exerted by the operator will act directly on the gang frame on which the foot pedal is mounted, thus decreasing the downward force required on the foot lever 61 to shift the gang frames laterally. The steering and gang shifting mechanism is, consequently, highly efficient and easy to operate.

Hoeing attachment

It is frequently desirable to add a hoeing attachment to a cultivator comprising a pair of hoes, one at each side of the row of plants, and such hoeing attachment is generally arranged on the machine so that the hoes or blades can be moved by the operator upwardly and downwardly into and out of the ground and toward and from the rows of plants independently of the other ground working members of the cultivator and independently of each other.

In the particular construction illustrated, I provide a hoeing attachment having the parts thereof clamped or removably secured to the gang frames 27 at the portions thereof which are nearest to each other. Each part of the hoeing attachment includes suitable clamping means 95, which can be removably secured to a gang frame 27, for example, by means of a bolt 94 extending through a hole in the gang frame and by means of which an upright bracket 96 is secured to the gang frame. An upright pivot rod 97 is journalled to rotate in this bracket, and a hoe supporting arm 105 is in turn mounted to swing up and down on a pivot carried on the rod 97. Thus a universal joint is provided between the arms 105 of the hoeing attachments and the gang frames.

Any suitable or desired type of hoe or ground working implement may be secured to the hoe supporting arm 105, and in the construction shown by way of example, I have illustrated a hoeing attachment comprising a ground working blade 115 which is secured to an upwardly extending arm 116 which may be suitably secured in a socket 117 in a hoe supporting member 112 on the rear end of the arm 105, for example, by means of a clamping bolt or set screw 118, so that the arm 116 may be secured in different relations to the hoeing attachment and so that the arm can be removed from the socket 117 and replaced by another hoe member. The hoe supporting member 112 also has secured thereto an upwardly extending arm 120, the upper end of which may be provided with a handle 121 and the arms 120 are so formed that the two handles of the two hoeing attachments extend into any convenient position with reference to the operator sitting in the rear seat 22. In the construction shown, the arms 120 have plates 122 welded or otherwise secured to the lower ends thereof which are bolted to the hoe supporting members 112.

The two parts of the hoeing attachment described can, of course, be moved independently of each other by means of the two handles 121 and can be swung toward and from each other about the upright pivot members 97 and can also be swung up and down against the action of the counterbalancing springs 102 so as to raise and lower the ground working members or hoes into the ground to the desired extent and out of the ground.

As shown in Fig. 5, one part of the hoeing attachment is preferably secured to the gang frame 27 somewhat ahead or forwardly of the other hoeing attachment on the other gang frame, and when arranged in this manner one of the ground working members or blades 115 will be in advance of the other blade. This arrangement is desirable so that the blades 115 will not strike when moved toward each other and so that an end portion of one blade may actually be in rear of the corresponding end of the other blade of the hoeing attachment, so that between plants of a row all weeds may be destroyed by bringing the parts of the hoeing attachment into overlapping relation just as the same pass a plant, and then again separating them when approaching a plant.

The hoeing attachment described has the advantage that it is of simple and compact form and the handles are sufficiently close to and directly connected with the blades 115, so that there will be comparatively little "spring" in the arms 120. This enables the operator to use the hoeing attachment with greater accuracy and with less danger of damaging plants. By arranging the operator's seat 22 as low as possible, the arms 120 can be made relatively short and by carrying the ground working blades 115 rearwardly from the gang frames by the arms 105, the hoes can be more easily actuated as well as with greater accuracy.

In the construction shown, the hoe supporting arms 105 are mounted below the gang frames 27 so that the hoe blades 115 are relatively close to the pivotal axes of the arms 105 as compared with the handles 121, so that the arms 120 exert considerable leverage on the ground working blades 115. It, consequently, requires less effort on the part of the operator to move the hoe blade 115 into and out of the ground, than was the case with hoeing attachments heretofore constructed.

The arrangement of the hoeing mechanism described results in an easy operation of the same for the reason that the mounting of the parts of the hoeing attachment below the gang frames enables the operator to exert such a leverage on the ground working blades 115, that comparatively little force need be applied to the handles 121 to move the blades into the ground to the desired extent.

The combination of the steering mechanism and hoeing attachment herein described also facilitates the work of the operator in that by pressing downwardly on one of the foot pedals 60 to steer the cultivator toward the side on which that pedal is located, and also to shift the gang frame in the same direction, the foot pedals will also move in the direction of the gang frames, and the hoeing attachment will move in the same direction. Consequently, in steering the cultivator in this manner, the operator's legs and arms naturally shift with the gang frames which in turn assists in the manipulation of the hoeing attachment. This shifting of the gang frames and hoeing attachment is particularly desirable for use in cultivating when the plants are not planted accurately in straight lines. If plants are encountered which are not far out of alinement with other plants, it is, of course, possible for the operator to merely shift the hoeing attachment without operating the steering mechanism.

I claim as my invention:

1. In a cultivator having a main frame, axles pivoted thereon, wheels on said axles and a gang frame adjustably mounted relatively to said main frame and carrying ground working implements, the combination of a foot operated lever pivoted on said gang frame, and means connecting said foot operated lever and said pivoted axles for swinging said axles in response to movements of said foot operated lever.

2. In a cultivator, the combination of a main frame, ground wheels, pivoted axles on which said ground wheels are journalled and which are pivotally connected with said frame, and a gang frame having pivotal connection at its front end with said main frame and carrying ground working implements, the combination of a foot lever pivoted on said gang frame, and connections between said foot lever and said pivoted axles and extending into proximity to said pivotal connection of said gang frame with said main frame, for transmitting motion of said foot lever to said pivoted axle to effect steering of said cultivator.

3. In a cultivator, the combination of a main frame, ground wheels, pivoted axles on which said ground wheels are journalled and which are pivotally connected with said frame, a gang frame having pivotal connection at its front end with said main frame and carrying ground working implements, and means for adjusting said gang frame relatively to said main frame about said pivotal connection, the combination of a foot lever pivotally mounted on said gang frame for approximately vertical movement relatively to said gang frame, and connections between said foot lever and said pivoted axles, which connections extend into proximity to the pivotal connection of said gang frame to said main frame, whereby up and down movement of said foot lever produces pivotal motion of said pivotal axles.

4. In a cultivator having a main frame, ground wheels supporting the main frame, axles on which said ground wheels are journalled and which are pivotally connected with said main frame, and a pair of gang frames having pivotal connections at their front ends with said main frame and adjustable vertically about said pivotal connections, the combination of a foot lever pivotally mounted on each gang frame for movement in a substantially vertical direction, a second lever pivoted on each gang frame adjacent to the pivotal connection thereof with said main frame and connected with the foot lever mounted on the same gang frame, and connections between said second levers of both gang frames and extending transversely of said main frame, said connections being also connected with said pivoted axles to effect steering of said cultivator.

5. In a cultivator having a main frame, ground wheels supporting the main frame, axles on which said ground wheels are journalled and which are pivotally connected with said main frame, and a pair of gang frames having pivotal connections at their front ends with said main frame and adjustable vertically about said pivotal connections, the combination of a foot lever pivotally mounted on each gang frame for movement in a substantially vertical direction, a second lever pivoted on each gang frame adjacent to the pivotal connection thereof with said main frame and connected with the foot lever mounted on the same gang frame, a connection extending from each second lever to said main frame and connected with said pivoted axles for steering said cultivator, said connections between said second levers and said main frame being substantially in a plane including a pivotal connection between said gang frame and said main frame, whereby vertical adjustment of said gang frame about said pivotal connection leaves said foot levers in substantially unchanged relation to the gang frames to which they are connected.

6. In a cultivator having a main frame, ground wheels supporting the main frame, axles on which the ground wheels are journalled and which are pivoted on said frame, a connecting bar connecting the pivoted axles for simultaneously swinging both axles, a pair of gang frames having their front ends pivotally connected with said main frames for up and down and lateral movement of said gang frames relatively to said main frame, and means associated with said connecting bar for imparting lateral movement of said connecting bar to said gang frames, the combination of a pair of foot levers, one pivotally mounted on each of said gang frames for movement relatively to the frame to which it is connected, and connections between said foot levers and said connecting bar for shifting said connecting bar when said foot levers are moved about their pivots, for effecting steering of said mechanism and for shifting said gang frames laterally.

7. In a cultivator having a main frame, ground wheels supporting the main frame, axles on which the ground wheels are journalled and which are pivoted on said frame, a connecting bar connecting the pivoted axles for simultaneously swinging both axles, a pair of gang frames having their front ends pivotally connected with said main frames for up and down and lateral movement of said gang frames relatively to said main frame, and means associated with said connecting bar for imparting lateral movement of said connecting bar to said gang frames, the combination of a pair of foot levers, one pivotally mounted on each of said gang frames for up and down movement relatively to the frame to which it is connected, and a connection extending from one of said foot levers to the other foot lever and extending lengthwise of said gang frames into proximity to the pivotal connections of said gang frames with said main frame and extending to said main frame and connected with said connecting bar for moving said connecting bar to effect steering of said cultivator and lateral movement of said gang frames.

8. In a cultivator having a main frame, ground wheels supporting the main frame, axles on which the ground wheels are journalled and which are pivoted on said frame, a connecting bar connecting the pivoted axles for simultaneously swinging both axles, a pair of gang frames having their front ends pivotally connected with said main frames for up and down and lateral movement of said gang frames relatively to said main frame, and means associated with said connecting bar for imparting lateral movement of said connecting bar to said gang frames, the combination of a pair of foot levers, one pivotally mounted on each of said gang frames for up and down movement relatively to the frame to which it is connected, another lever mounted on each gang frame adjacent to the pivotal connection thereof, a link connecting said last mentioned lever with said foot lever, and a flexible member connecting the two last mentioned levers and extending to said main frame, sheaves for guiding a portion of said flexible member to move transversely to said main frame in proximity to said connecting bar, and a connection between said flexible member and said connecting bar for moving said connecting bar transversely of said main frame for steering said cultivator and shifting said gang frames laterally thereof.

9. In a cultivator having a main frame, ground wheels supporting said main frame, axles on which said ground wheels are journalled and which are pivotally mounted on said main frame, gang frames adjustably mounted on said main frame, and means for shifting said gang frames laterally relatively to said main frame, the combination of a foot lever pivotally mounted on each of said gang frames for pivotal movement relatively to said gang frame, movement transmitting means which connect said foot levers with said pivoted axles for steering said cultivator, said movement transmitting means also connecting with said means for shifting said gang frames laterally, and a hoeing device mounted on each gang frame and including hoes for working the ground, and handles for moving said hoes, said hoeing devices and foot levers being movable with said gang frames.

CURTIS L. HARBOLT.